(12) United States Patent
Yoshida

(10) Patent No.: US 6,220,981 B1
(45) Date of Patent: Apr. 24, 2001

(54) LINK PLATE FOR POWER TRANSMISSION CHAIN

(75) Inventor: Isamu Yoshida, Saitama-ken (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/252,674

(22) Filed: Feb. 22, 1999

(30) Foreign Application Priority Data

Feb. 23, 1998 (JP) .................................................. 10-040370

(51) Int. Cl.$^7$ ................................. F16H 7/08; F16H 7/18; F16H 13/04
(52) U.S. Cl. ........................... 474/111; 474/140; 474/212
(58) Field of Search .................................. 474/101, 111, 474/140, 155–157, 202, 206, 212, 213, 228, 230, 91; 59/5–7, 84

(56) References Cited

U.S. PATENT DOCUMENTS

| | | | |
|---|---|---|---|
| 867,208 | * | 9/1907 | McIntyre ............................. 474/213 |
| 1,727,129 | * | 9/1929 | Morse .................................. 474/213 |
| 2,355,003 | * | 8/1944 | McCann ............................. 474/91 X |
| 2,798,381 | * | 7/1957 | Siverson ............................. 474/206 |
| 3,948,114 | | 4/1976 | Koinzan .......................... 74/242.11 C |
| 4,099,424 | | 7/1978 | Pemberton ........................ 74/251 R |
| 4,328,665 | | 5/1982 | Taubert et al. ......................... 59/88 |
| 4,411,131 | * | 10/1983 | Ohnishi et al. ...................... 59/84 X |
| 5,073,153 | | 12/1991 | Wu ...................................... 474/206 |
| 5,176,584 | * | 1/1993 | Ishida et al. ........................... 474/213 |
| 5,242,333 | * | 9/1993 | Sugimoto et al. .................... 474/212 |
| 5,797,818 | * | 8/1998 | Young .................................. 474/111 |
| 5,908,363 | * | 6/1999 | Suzuki ................................. 474/111 |
| 5,967,926 | * | 10/1999 | Kozakura et al. .................... 474/213 |
| 5,984,815 | * | 11/1999 | Baddaria ............................. 474/111 |

FOREIGN PATENT DOCUMENTS

| | | | |
|---|---|---|---|
| 2 326 213 | | 12/1998 | (GB) . |
| 63-219940A | * | 9/1988 | (JP) ..................................... 474/212 |

* cited by examiner

Primary Examiner—Thomas R. Hannon
(74) Attorney, Agent, or Firm—Armstrong, Westerman, Hattori, McLeland & Naughton, LLP

(57) ABSTRACT

In a link plate for use in a power transmission chain driven to run while a side edge of the link plate is in sliding contact with a shoe surface a chain guide member, the side edge of the link plate has a pair of contact portions near opposite longitudinal ends thereof for sliding contact with the shoe surface, and a recessed central portion extending between the contact portions. The recessed central portion together with the shoe surface forms a space which is capable of collecting and holding lubricating oil when the contact portions are in sliding contact with the shoe surface. As the link plate slides on the shoe surface, the lubricating oil trapped inside the space gradually enters between the contact portions and the shoe surface to thereby form an oil film. With this oil film, friction between the link plate and the shoe surface is reduced, leading to reduction of running resistance of the power transmission chain.

8 Claims, 6 Drawing Sheets

LINK PLATE FOR POWER TRANSMISSION CHAIN

BACKGROUND OF THE INVENTION

1. Field of the Invention

The present invention relates generally to a chain link plate, and more particularly to a link plate for a power transmission chain driven for running while a side edge of the link plate is kept in sliding contact with a shoe surface a chain guide and the like.

2. Description of the Related Art

Conventional power transmission chains generally include a link plate A1 having rectilinear side edges A2, as shown in FIG. 6(a), or a link plate B1 having curvilinear side edges B2 concaved at longitudinal central portions thereof, as shown in FIG. 6(b).

In a conventional power transmission chain C shown in FIG. 7(a), the link plate A1 having a contour shown in FIG. 6(a) is used as both inner and outer plates of the power transmission chain C. The power transmission chain C is trained around a drive sprocket S1 and a driven sprocket S2 for transmitting rotation of the drive sprocket S1 to the driven sprocket S2.

A chain guide X is disposed exteriorly of a loop of the power transmission chain on a tension run side of the power transmission chain C. The chain guide X has a shoe surface G designed for sliding contact with a side edge A2 of each link plates A1 to prevent the tension run of the power transmission chain C from swinging or whipping while the chain C is running.

Similarly, a tensioner Y disposed exteriorly of the chain loop on a slack run side of the power transmission chain C has a tensioner lever R pivotally connected at one end by a pivot pin J, and a tensioner body H urging the other end (distal end) of the tensioner lever R from the back in a direction to force a shoe surface G' of tensioner lever R against the side edges A2 of the link plates A1. The tensioner Y thus constructed operates to remove a sag of the power transmission chain C so that the slack run of the power transmission chain C is prevented from whipping while the chain C is running.

In the conventional power transmission chain C, when the rectilinear side edge A2 of each link plate A1 is in sliding contact with the shoe surface G' curving outward, as shown in FIG. 7(b), the side edge A2 and the shoe surface G' are contacting at one point P. Since the contact point P changes unstably on the side edge A2 as the chain C moves, the contact pressure between the side edge A2 and the shoe surface G' becomes high and thus makes it difficult to form a lubricating oil film between the side edge A2 and the shoe surface G'. Even when a lubricating oil film is formed between the side edge A2 of the link plate A1 and the shoe surface G', such lubricating oil film is likely to be broken or ruptured. Thus, the power transmission chain C while running is subjected to a relatively large running resistance due to break of the lubricating oil film.

When the side edge A2 of the plate A1 is in sliding contact with a flat shoe surface G of the chain guide X, as shown in FIG. 7(c), the side edge A2, due to its rectilinear configuration, engages with the flat shoe surface G over the entire area thereof. This engagement makes it difficult to keep a lubricating oil film between the side edge A2 and the shoe surface G. Additionally, due to a large contact area between the side edge A2 and the shoe surface G, the power transmission chain C while running encounters a large running resistance.

In the case of a power transmission chain having link plates B1 narrowed at longitudinal central portions, as shown in FIG. 6(b), the curvilinear side edge B2 of each link plate B1 comes into sliding contact with the flat shoe surface G at two portions located near opposite longitudinal ends of the side edge B2, as shown in FIG. 8. The link plate B1 having such curvilinear side edge B2 has a smaller contact area relative to the shoe surface G as compared to the link plate A1 having the rectilinear side edge A2 shown in FIG. 6(a). However, due to the narrowed longitudinal central portion of the link plate B1, there is a large space S formed between a concaved central portion of the side edge B2 and the shoe surface G. The large space S cannot retain or hold within it lubricating oil L, tending to cause break of the lubricating oil film at contact points between the side edge B2 and the shoe surface G.

SUMMARY OF THE INVENTION

It is accordingly an object of the present invention to overcome the foregoing difficulties associated with the prior art and to provide a link plate for power transmission chains which is capable of collecting and holding a lubricating oil between a side edge of the link plate and a shoe surface of a chain guide member so as to reduce a running resistance of the chain produced due to frictional engagement between the side edge and the shoe surface.

A link plate of the present invention is used in a power transmission chain which is driven to run while a side edge of the plate is in sliding contact with a shoe surface of a chain guide member. The link plate includes a pair of contact portions provided on the side edge adjacent to opposite longitudinal ends thereof for sliding contact with the shoe surface, and a recessed central portion of the side edge extending between the pair of contact portions so as to form together with shoe surface a space which is capable of collecting and holding lubricating oil when the contact portions are in sliding contact with the shoe surface.

As the link plate slides on the shoe surface, the lubricating oil trapped in the space gradually enters between the contact portions and the shoe surface to thereby form an oil film. The oil film lowers friction between the contact portions and the shoe surface and hence reduces running resistance of the power transmission chain.

The recessed central portion may have a flat surface slightly spaced from the shoe surface, a knurled surface having a number of small ridges, or a corrugated surface having alternate ridges and grooves. The ridges have tip ends slightly spaced from the shoe surface. The spacing between said recessed central portion and the shoe surface is preferably not greater than 0.5 mm.

The contact portions of the link plate may be arcuate. In the case where the recessed central portion used in combination with the arcuate contact surfaces is rectilinear, it is preferably to provide a round corner portion extending continuously between each of the arcuate contact portions and an adjacent one of opposite ends of the rectilinear recessed central portion.

The above and other features and advantages of the present invention will become manifest to those versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Figure 1:
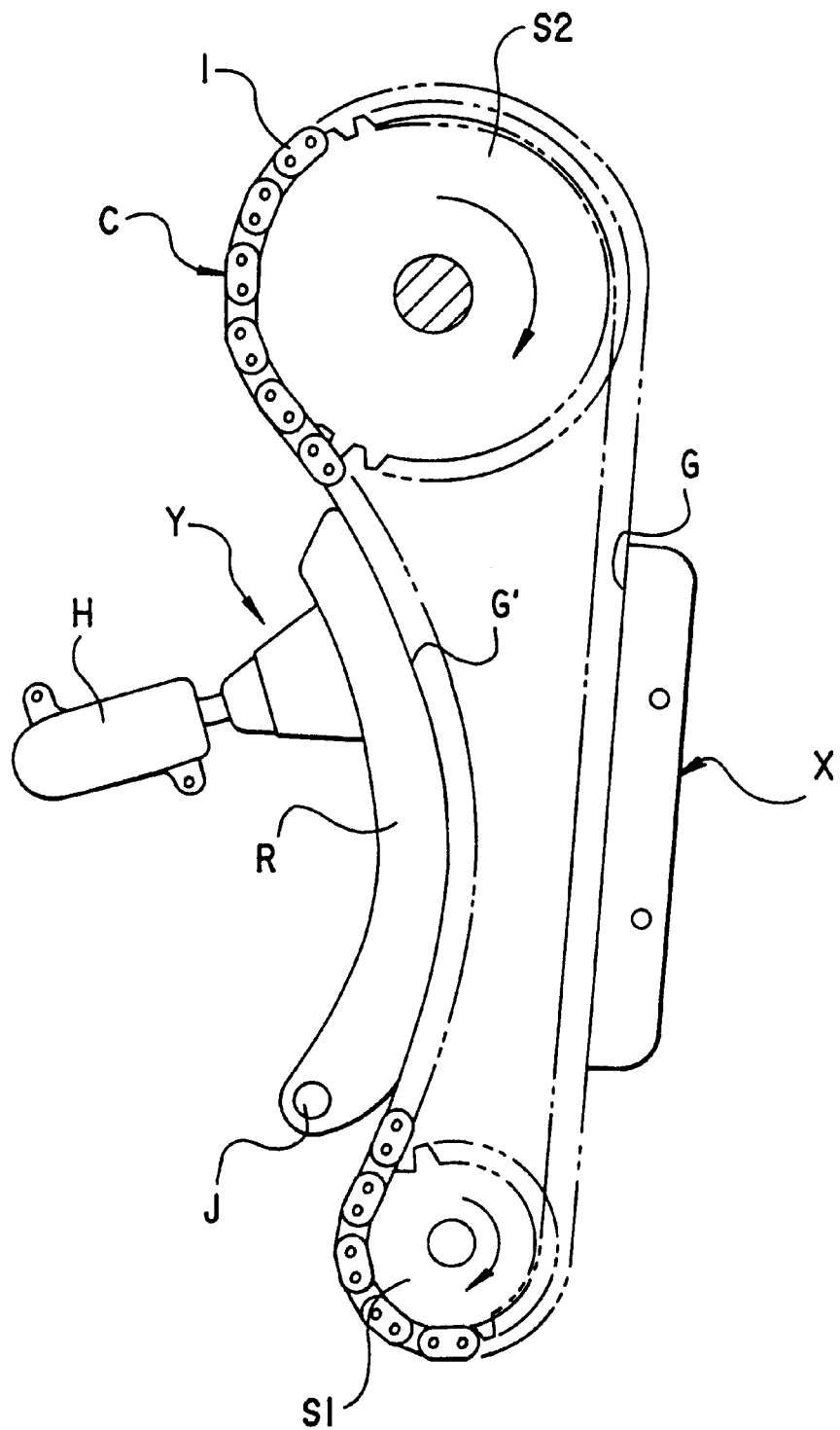
FIG. 1 is a schematic front elevational view of a power transmission chain having link plates according to one embodiment of the present invention.

Certain preferred embodiments of the present invention will be described in greater detail with reference to the accompanying drawings wherein like or corresponding parts are designated by similar reference characters throughout several views.

Referring now to FIG. 1, there is shown a power transmission chain C having link plates 1 according to one embodiment of the present invention. The chain C is trained around a pair of drive and driven sprockets S1 and S2 for transmitting rotation of the drive sprocket S1 to the driven sprocket S2. A chain guide X is disposed exteriorly of a loop of the chain C on a tension run side of the chain for guiding a tension run of the chain stably against shipping. The chain guide X has a flat shoe surface G designed for sliding contact with a side edge of each link plate 1. Similarly, a tensioner Y disposed exteriorly of the chain loop on a slack run side of the chain C has a tensioner lever R pivoted at one end by a pivot pin J, and a tensioner body H urging the other end (distal end) of the tensioner lever R from the back in a direction to force a shoe surface G' of tensioner lever R against the side edges of the link plates 1 so that a sag of the power transmission chain C is removed to thereby prevent a slack run of the chain C is prevented from whipping while the chain C is running. The tensioner lever R having the shoe surface G' serves also as a chain guide member.

Figure 2:
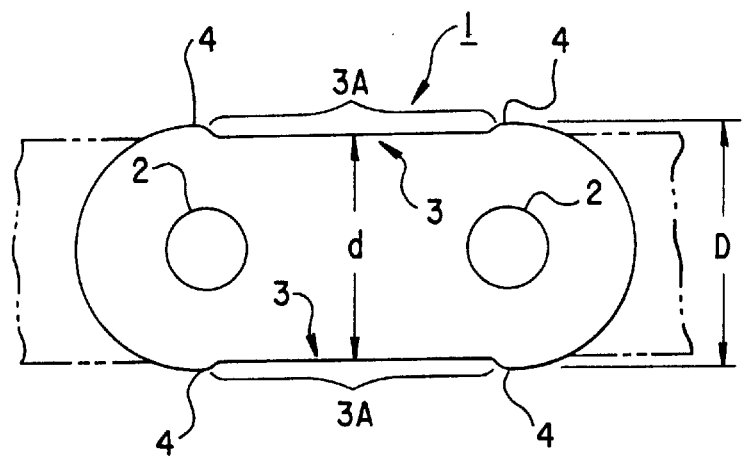
FIG. 2 is an enlarged front elevational view of one of the link plates of the chain.

As shown in FIG. 2, the link plate 1 is an outer plate used in the power transmission chain C. Like an outer plate of a roller chain, the outer plate 1 has a pair of pin holes 2, 2 located on a longitudinal central axis of the outer plate 1 and spaced equidistantly from a center of the outer plate The outer plate 1 has opposite longitudinal edges (side edges) 3 each having two contact portions 4 adjacent to opposite longitudinal ends thereof, and a recessed central portion 3A extending between the contact portions 4. The depth of the outer plate 1 is slightly smaller at the recessed central portions 3A, 3A than at the contact portions 4, 4 of the opposite side edges 3, 3 (d<D).

Though not shown, an inner plate next to the outer plate 1 in a transverse inward direction of the chain C has substantially the same configuration as the outer plate 1 with the exception that the pin holes 2 are replaced by bushing holes for receiving therein bushings on which rollers are rotatably mounted.

Figure 3A:
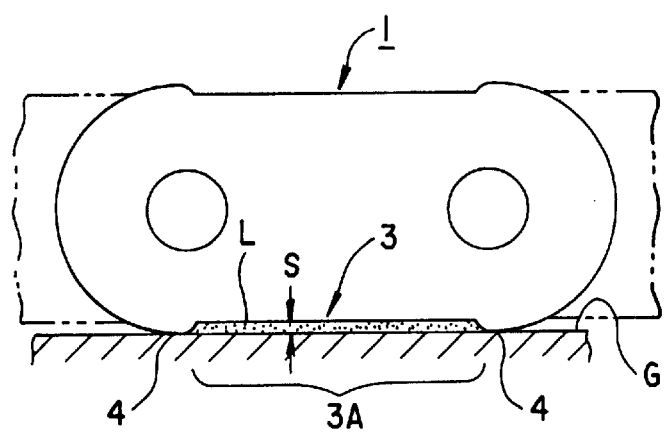
FIG. 3(a) is a view similar to FIG. 2, showing the manner in which the link plate is in contact with a flat shoe surface of a chain guide used with the chain.
Figure 3B:
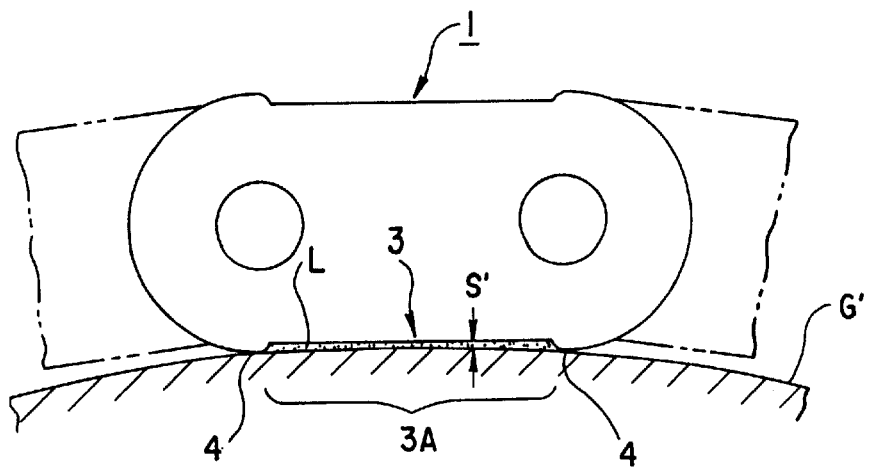
FIG. 3(b) is a view similar to FIG. 2, showing the manner in which the link plate is in contact with an outwardly curved shoe surface of a chain tensioner used with the chain.

FIGS. 3(a) and 3(b) show the manners in which the outer plate 1 is in sliding contact with the respective shoe surface G, G' of the chain guide X and tensioner Y (FIG. 1). As shown in FIG. 3(a), the outer plate 1 is in sliding contact with the flat rectilinear shoe surface G of the chain guide X (FIG. 1) at its contact portions 4 located near the opposite longitudinal ends of the side edge 3.

While the chain C is running, lubricating oil L is supplied from the outside of the chain C to the outer plate 1 and the shoe surface G whereupon the lubricating oil L enters a small gap or space S defined between the shoe surface G and the recessed central portion 3A of the side edge 3 of the outer plate 1. The lubricating oil L is collected in the space S and held or retained within the space S. The space S is hereinafter referred to as "oil holding space".

As the plate 1 moves along the shoe surface G, the lubricating oil L trapped within the oil holding space S gradually moves in between the contact portions 4 and the shoe surface G to thereby form an oil film between the contact portions 4 and the shoe surface G. With the oil film thus formed, friction between the outer plate 1 and the shoe surface G is considerably reduced.

When the quantity of lubricating oil L held inside the oil holding space S decreases, surrounding lubricating oil L is taken into the oil holding space S so that a stable oil film can always be maintained between the contact portions 4 and the shoe surface G.

The oil holding space S formed between the shoe surface G and the recessed central portion 3A of the side edge 3 of the outer plate 1 is preferably greater than a maximum surface roughness or irregularity of the recessed central portion 3A produced in the manufacture of the outer plate 1 and smaller than 0.5 mm. The outer plate 1 having the recessed central portions 3A requires a smaller amount of material than the conventional plate and can lower the overall weight of the chain C.

FIG. 3(b) illustrates the manner in which the outer plate 1 is in sliding contact with the curvilinear shoe surface G' of the tensioner Y (FIG. 1). Although the shoe surface G' curves outwardly, the outer plate 1 contacts with the curved shoe surface G' at its two contact portions 4, 4. Thus, there is a small gap or space S' defined between the shoe surface G' and the recessed central portion 3A extending between the contact portions 4. The lubricating oil L is collected in the space S' and then held within the space S'. The space S' is also hereinafter referred to as "oil holding space".

As the outer plate 1 slides on the shoe surface G', the lubricating oil L inside the oil holding space S' gradually moves in between the contact portions 4 and the shoe surface G' to thereby form an oil film between the contact portions 4 and the shoe surface G'. The oil film considerably lowers friction between the contact portions 4 and the shoe surface G', thereby reducing running resistance of the chain C.

FIGS. 4(a) through 4(d) inclusive show various configurations of the central portion 3A of the outer plate according to different embodiments of the present invention.

Figure 4A:
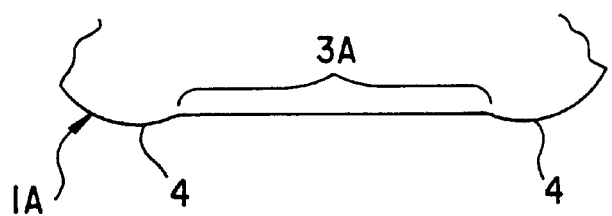
FIGS. 4(a) through 4(d) inclusive are fragmentary front elevational views showing various configurations of the central portion of a side edge of the link plate according to different embodiments of the present invention.

An outer plate 1A shown in FIG. 4(a) has a recessed rectilinear central portion 3A formed between arcuate contact portions 4, 4. By virtue of its arcuate configuration, the contact portions 4 is well adaptable for use with various configurations of the shoe surface ranging from the rectilinear shoe surface G (FIG. 1) to the curvilinear shoe surface G' (FIG. 1).

Figure 4B:
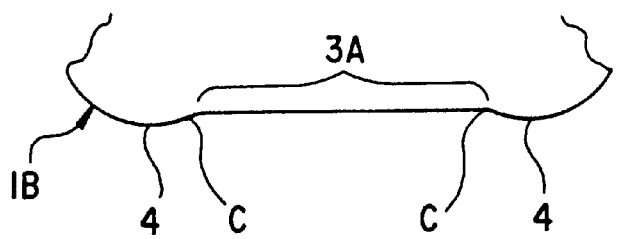

FIG. 4(b) shows a modified outer plate 1B having a round portion C smoothly interconnecting each arcuate contact portion 4 and an adjacent end of a recessed rectilinear central portion 3A. The round portions C are effective to lighten stress concentration caused due to a tension acting in the longitudinal direction of the outer plate 1B and thus increases the durability of the outer plate 1B.

Figure 4C:
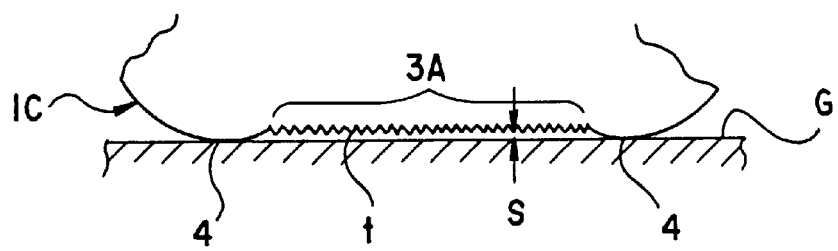

Another modified outer plate 1C shown in FIG. 4(c) includes a recessed central portion 3A having a knurled surface. The knurled surface has a number of small projections or ridges t. Tip ends of the ridges t are slightly spaced from the shoe surface G when arcuate contact portions 4 located at opposite ends of the recess central portion 3A are in contact with the shoe surface G. Thus, there is a small gap or space S defined between the shoe surface G and the recessed central portion 3A of the side edge 3 for holding therein lubricating oil L.

By virtue of the knurled surface having such small ridges t, the recessed central portion 3A of the side edge 3 has an increased contact area relative to the lubricating oil L and hence has a large oil-retaining force which is sufficient to keep the lubricating oil L within the oil holding space S without causing accidental break or rupture of an oil film formed between the contact portions 4 and the shoe surface G.

Figure 4D:
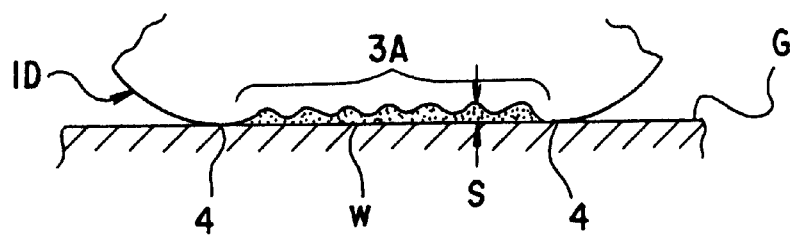

FIG. 4(d) shows still another modified outer plate 1D according to the present invention. The modified outer plate 1D includes a side edge 3 having a recessed central portion 3A. The central portion 3A has a corrugated surface having a plurality of alternate ridges W and grooves arranged in the longitudinal direction of the side edge 3. When opposite contact portions 4, 4 of the side edge 3 are in contact with the shoe surface G, the ridges W of the corrugated surface are slightly spaced from the shoe surface G so that there is a small gap or space S defined between the shoe surface G and the central portion 3A of the side edge 3 for holding therein lubricating oil L. Owing to the corrugated surface of the recessed central portion 3A, the oil holding space L is alternately narrowed and widened at uniform intervals in the longitudinal direction of the side edge 3. The oil holding space S of this configuration is able to accommodate a relatively large quantity of lubricating oil with increased oil-holding force.

Although the outer plates 1, 1A, 1B, 1C and 1D shown in the embodiments described above are plates used in power transmission roller chains, the same design can be also used in plates employed in power transmission bushed chains.

Though not shown, in an application where the side edge of a plate comes into sliding contact with an arcuate shoe surface only, a recessed central portion of the side edge may be arcuate and extending parallel to the arcuate shoe surface so as to define, jointly with the arcuate shoe surface, an oil holding space having a uniform width (namely, an extent in the transverse direction of the plate) throughout the length thereof.

Figure 5:
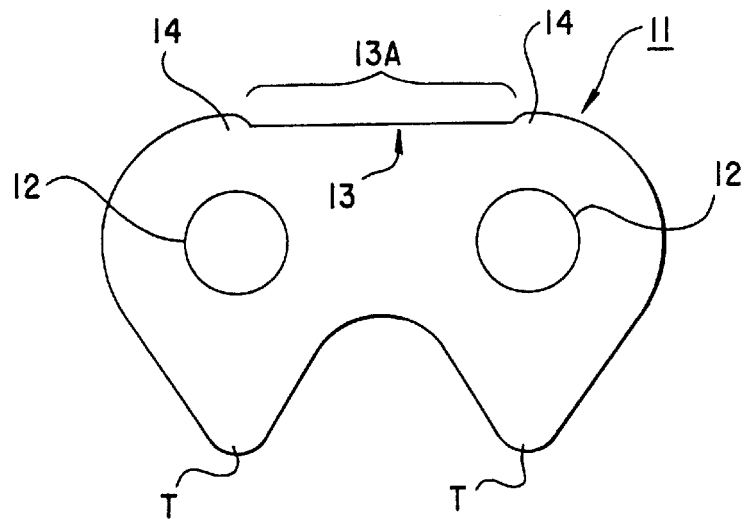
FIG. 5 is a front elevational view showing one form of the present invention embodied in a link plate of a silent chain.

FIG. 5 shows a further embodiment of the link plate according to the present invention. The link plate 11 is used in a silent chain (not show) incorporated in a chain power transmission mechanism of a car engine, for example.

The link plate 11 has a pair of pin holes 12, 12 for receiving therein pins which interconnect a plurality of such link plates side by side so as to form a silent chain, and a pair of teeth T projecting from an inner peripheral edge of the silent chain for meshing engagement with sprockets (not shown). The link plate 11 further has a side edge 13 forming a part of an outer peripheral edge of the silent chain. The side edge 13 has a pair of contact portions 14, 14 near opposite longitudinal ends thereof, and a recessed central portion 13A extending rectilinearly between the contact portions 14, 14. When the contact portions 14, 14 are in sliding contact with a shoe surface (not shown) of a chain guide or a tensioner, the recessed central portion 13A together with the shoe Form a space which is capable of collecting and holding lubricating oil.

Figure 6A:
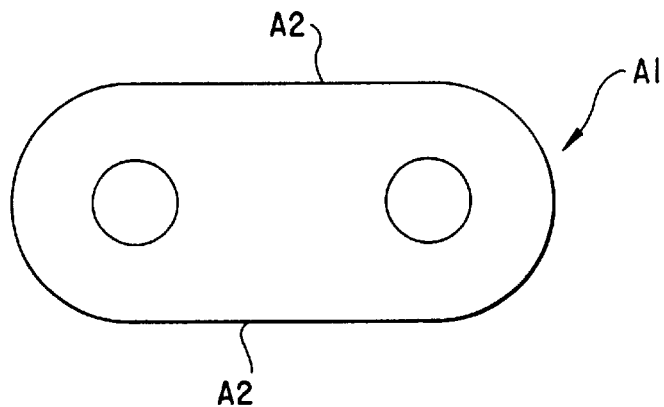
FIG. 6(a) is a front elevational view showing a typical conventional link chain having rectilinear side edges.
Figure 6B:
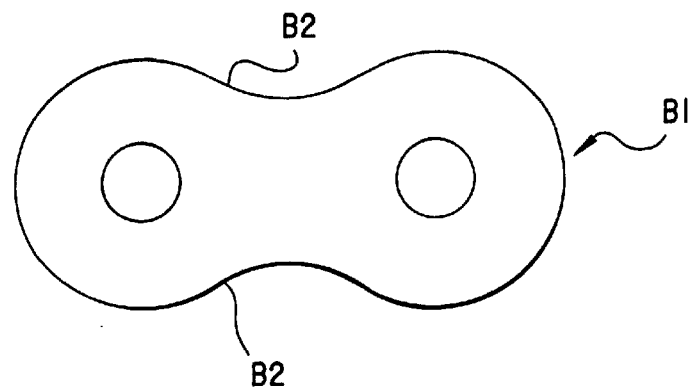
FIG. 6(b) is a view similar to FIG. 6(a), but showing another conventional link plate narrowed at its longitudinal central portion having curvilinear side edges.
Figure 7A:
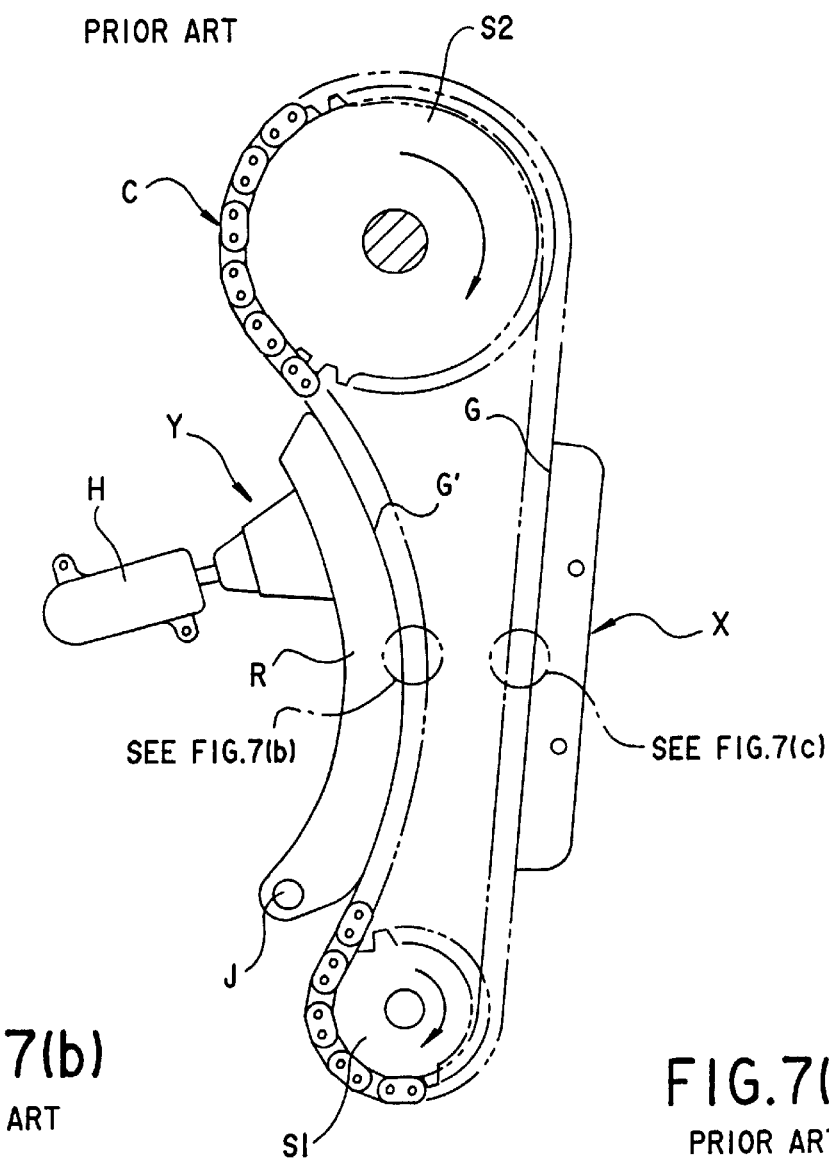
FIG. 7(a) is a front elevational view of a power transmission chain used in combination with a chain guide and a tensioner.
Figure 7B:
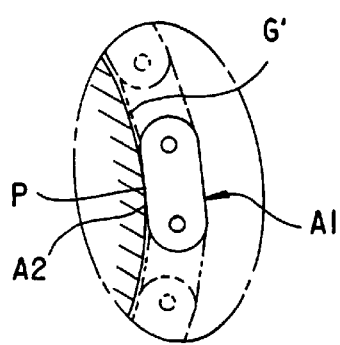
FIG. 7(b) is an enlarged view of a portion in a circle shown in FIG. 7(a), showing the manner in which each link plate of the chain and an outwardly curved shoe surface of the tensioner are in contact with each other.
Figure 7C:
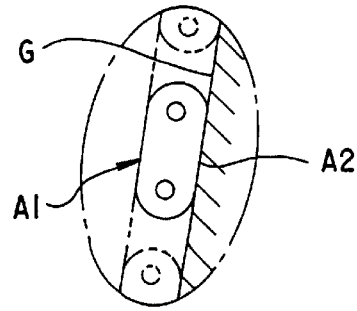
FIG. 7(c) is an enlarged view of a portion in another circle shown in FIG. 7(a), showing the manner in which the link plate of the chain is in contact with a flat shoe surface of the chain guide.
Figure 8:
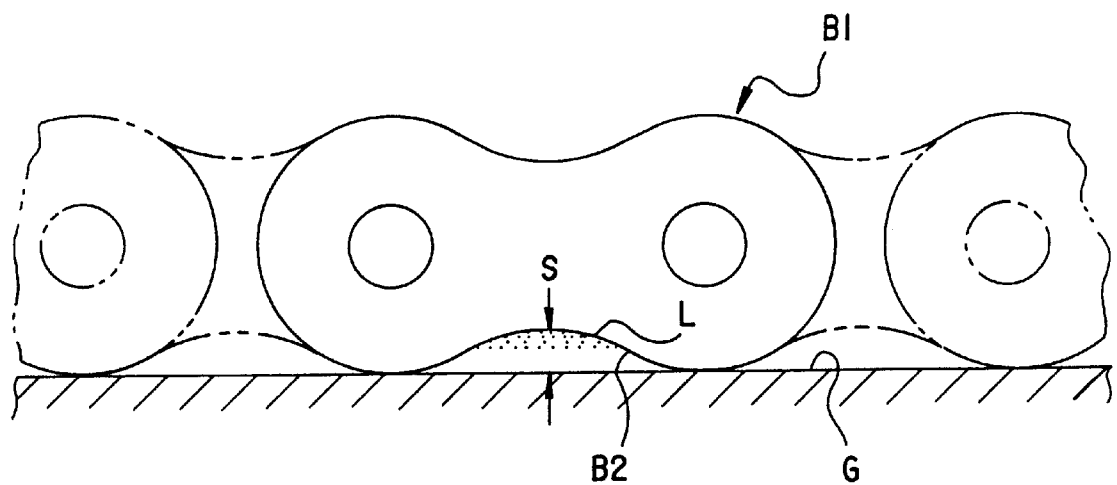
FIG. 8 is a view similar to FIG. 7(c), but showing the manner in which the conventional link plate shown in FIG. 6(b) is in contact with the flat shoe surface.

Plural link plates of the present invention are used to build up a power transmission chain. In this instance, it is not necessary to utilize the link plates of the present invention only. They may be used in combination with the conventional link plates A1, B1 shown in FIGS. 6(a) and 6(b). In the case of assembling a silent chain having a plurality of rows of link plates interconnected side by side in the crosswise direction of the chain, the link plate of the present invention and the conventional link plates A1, B1 shown in FIGS. 6(a) and 6(b) may be used in combination to form each group of link plates arranged in lateral juxtaposition with each other.

In the case of a link plate designed for use in a roller chain or a bushed chain, the contact portions and the recessed central portion is in no way provided on both side edges but they may be provided on only one side edge adapted to engage with the shoe surface of a chain guide or a tensioner in the same manner as the link plate used in silent chains.

The configuration of the contact portions and recessed central portion should by no means be limited to those shown in the foregoing embodiments but may include any other configuration provided that the contact portions and the central portion form jointly with the shoe surface a space which is capable of collecting and holding therein lubricating oil.

As described above, a link plate according to the present invention has two contact points provided on a side edge adjacent to opposite longitudinal end portions thereof. When the link plate used in a power transmission chain moves along a shoe surface of a chain guide or a tensioner, the contact portions of the side edge are in sliding contact with the shoe surface, there bing a space defined between the shoe surface and a central portion of the side edge extending between the contact portions. Lubricating oil, which is supplied externally onto the plate and the shoe surface while the chain is running, moves into the space and is collected in the space. The space defined between the recessed central portion and the shoe surface can retain or hold the lubricating oil.

Additionally, since the contact portions are held in sliding contact with the shoe surface while the link plate moves along the shoe surface, the capacity of the space is kept substantially unchanged. The lubricating oil which has get into the space is stably held within the space, and as the plates moves, the lubricating oil inside the space is gradually supplied between the contact portions and the shoe surface to thereby form an oil film between the contact portions of the link plate and the shoe surface. The oil film thus formed lowers friction between the contact portions and the shoe surface and thus reduces running resistance of the power transmission chain. The link plate, as it moves along an outwardly curved shoe surface, is kept in sliding contact with the curved shoe surface at its two contact portions. With this two-point sliding engagement, the contact pressure between the link plate and the shoe surface is relatively low. Running resistance of the power transmission chain caused due to friction between the side edge of the plate and the shoe surface can, therefore, be reduced.

Obviously, various changes and modifications of the invention are possible in the light of the above teaching. It is to be understood that within the scope of the appended claims the present invention may be practiced otherwise than as specifically described.

What is claimed is:

1. A combination of a shoe surface of a chain guide member and a link plate for a power transmission chain driven to run while a side edge of said plate is in sliding contact with said shoe surface, said link plate comprising:
    a pair of contact portions provided on said side edge adjacent to opposite longitudinal ends thereof for sliding contact with the shoe surface;
    a recessed central portion of said side edge extending between said pair of contact portions; and
    a space, defined between said shoe surface and said recessed central portion, collecting and holding lubricating oil when said contact portions are in sliding contact with the shoe surface.

2. The combination of a shoe surface of a chain guide member and a link plate according to claim 1, wherein said recessed central portion has a flat surface slightly spaced from the shoe surface.

3. The combination of a shoe surface of a chain guide member and a link plate according to claim 1, wherein said recessed central portion has a knurled surface having a number of small ridges, said ridges having tip ends slightly spaced from the shoe surface.

4. The combination of a shoe surface of a chain guide member and a link plate according to claim 1, wherein said recessed central portion has a corrugated surface having alternate ridges and grooves, said ridges having tip ends slightly spaced from the shoe surface.

5. The combination of a shoe surface of a chain guide member and a link plate according to claims 1, 2, 3 or 4, wherein the spacing between said recessed central portion and the shoe surface is not greater than 0.5 mm.

6. The combination of a shoe surface of a chain guide member and a link plate according to claim 5, wherein said contact portions are arcuate.

7. The combination of a shoe surface of a chain guide member and a link plate according to claim 1, wherein said contact portions are arcuate and said recessed central portion is rectilinear, each of said arcuate contact portions and an adjacent one of opposite ends of said rectilinear recessed central portion being interconnected by a round corner portion.

8. The combination of a shoe surface of a chain guide member and a link plate according to claim 7, wherein the spacing between said recessed central portion and the shoe surface is not greater than 0.5 mm.

* * * * *